United States Patent
Kopotev et al.

(10) Patent No.: US 10,031,876 B2
(45) Date of Patent: Jul. 24, 2018

(54) SERVER SYSTEM AND MANAGEMENT METHOD THEREOF

(71) Applicant: Samsung Electronics Co., Ltd., Suwon-si (KR)

(72) Inventors: Artem Kopotev, Suwon-si (KR); Jae-hong Min, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 321 days.

(21) Appl. No.: 14/973,989

(22) Filed: Dec. 18, 2015

(65) Prior Publication Data

US 2016/0335214 A1  Nov. 17, 2016

(30) Foreign Application Priority Data

May 13, 2015  (KR) ........................ 10-2015-0066948

(51) Int. Cl.
| | |
|---|---|
| G06F 13/00 | (2006.01) |
| G06F 3/06 | (2006.01) |
| G06F 13/42 | (2006.01) |
| H04L 29/08 | (2006.01) |
| G06F 13/40 | (2006.01) |

(52) U.S. Cl.
CPC ........ *G06F 13/4022* (2013.01); *G06F 3/0613* (2013.01); *G06F 3/0655* (2013.01); *G06F 3/0679* (2013.01); *G06F 13/4282* (2013.01)

(58) Field of Classification Search
None
See application file for complete search history.

(56) References Cited

U.S. PATENT DOCUMENTS

| | | |
|---|---|---|
| 8,423,756 B2 | 4/2013 | Harmer |
| 8,468,514 B2 | 6/2013 | Dang |
| 8,484,631 B2 | 7/2013 | Mortensen |
| 8,583,908 B2 | 11/2013 | Zimmer et al. |
| 8,589,902 B2 | 11/2013 | Jones et al. |
| 8,595,343 B2 | 11/2013 | Cherian et al. |
| 8,601,250 B2 | 12/2013 | Kochar et al. |
| 8,694,761 B2 | 4/2014 | Zimmer et al. |
| 8,726,258 B2 | 5/2014 | Mortensen |
| 8,838,948 B2 | 9/2014 | Harmer |
| 2009/0327741 A1 | 12/2009 | Zimmer et al. |
| 2013/0024595 A1 | 1/2013 | Subramaniyan et al. |
| 2013/0104188 A1 | 4/2013 | Western et al. |
| 2013/0254358 A1 | 9/2013 | Phung et al. |
| 2014/0281577 A1 | 9/2014 | Nicholes |
| 2015/0143018 A1 | 5/2015 | Kim et al. |
| 2015/0254082 A1* | 9/2015 | Vishwanathan ...... G06F 9/4416 713/2 |

\* cited by examiner

*Primary Examiner* — Idriss N Alrobaye
*Assistant Examiner* — Dayton Lewis-Taylor
(74) *Attorney, Agent, or Firm* — Onello & Mello, LLP

(57) ABSTRACT

In a server system and a management method thereof, the management method includes generating at least one virtual device for transmitting option read-only memory (ROM) data that is necessary for using a target physical device of at least one physical device, allocating the at least one virtual device to at least one host to correspond to the at least one host, and transmitting the option ROM data to a host corresponding to the at least one virtual device. The switch device may comprise a peripheral component interconnect express (PCIe) switch device.

18 Claims, 13 Drawing Sheets

SERVER SYSTEM AND MANAGEMENT METHOD THEREOF

CROSS-REFERENCE TO RELATED APPLICATION

This application claims priority under 35 U.S.C. § 119 to Korean Patent Application No. 10-2015-0066948, filed on May 13, 2015, the entire content of which is incorporated herein by reference in its entirety.

BACKGROUND

1. Technical Field

The inventive concepts relate to a server system and a management method thereof, and more particularly, to a server system which includes and controls a switch device connecting at least one host to the server system and a management method thereof.

2. Description of Related Art

A server system denotes a computer system that provides an information service to another computer system included in a network. Also, a computer system that requests information from another computer system (i.e., the server system) provided with an information service to receive the information from the server system is referred to as a client system. The server system may be categorized into a web server, a storage server, etc. depending on the purpose of use.

The server system may include a plurality of hosts and a plurality of physical devices. Research is being actively conducted into a method of receiving, by a plurality of hosts, option read-only memory (ROM) data necessary for the plurality of hosts to use a plurality of physical devices.

SUMMARY

The inventive concepts provide a server system controlling a switch device and a management method thereof, which quickly and accurately transmit option read-only memory (ROM) data, which is necessary for a plurality of hosts connected to the switch device to perform at least one of a hardware function and a software function, to the plurality of hosts.

According to an aspect of the inventive concepts, there is provided a management method of a server system, including at least one host, a management system, and a switch device connecting the at least one host to the management system, including: generating at least one virtual device for transmitting option read-only memory (ROM) data that is necessary for the at least one host to perform at least one of a hardware function and a software function; allocating the at least one virtual device to the at least one host to correspond to the at least one host; and transmitting the option ROM data to at least one target host that is a host corresponding to the at least one virtual device.

The management system may include an option ROM manager, and the option ROM manager may include a processor, which generates the option ROM data, and a storage device that stores the option ROM data.

The allocating of the at least one virtual device may include connecting the at least one virtual device to the at least one host through the switch device in one-to-one correspondence.

The server system may include at least one physical device connected to the at least one host, and the at least one host connect the at least one physical device based on the option ROM.

The management method may further include: for receiving the option ROM data, by the at least one target host, transmitting a memory read request signal, which requests the option ROM data, to a virtual device corresponding to the at least one target host; and performing a redirection operation for the management system to receive the memory read request signal.

The management method may further include, when the management system receives the memory read request signal, by the management system, transmitting a memory read response signal including the option ROM data to the at least one target host in response to the memory read request signal.

The management method may further include generating, by the at least one target host, a driver for performing at least one of the hardware function and the software function, based on the transmitted option ROM data.

According to another aspect of the inventive concepts, there is provided a server system including: an embedded processor; at least one processor board that functions as a host; at least one peripheral component interconnect express (PCIe) device; and a PCIe switch device that includes a plurality of ports connected to the embedded processor, the at least one processor board, and the at least one PCIe device, wherein the embedded processor generates option read-only memory (ROM) data which is necessary for the at least one processor board to use the at least one PCIe device, and controls the PCIe switch device to transmit the generated option ROM data to the at least one processor board.

The at least one PCIe device may include at least one of a network card and a storage board.

BRIEF DESCRIPTION OF THE DRAWINGS

Exemplary embodiments of the inventive concepts will be more clearly understood from the following detailed description taken in conjunction with the accompanying drawings in which.

DETAILED DESCRIPTION OF EMBODIMENTS

Figure 1:
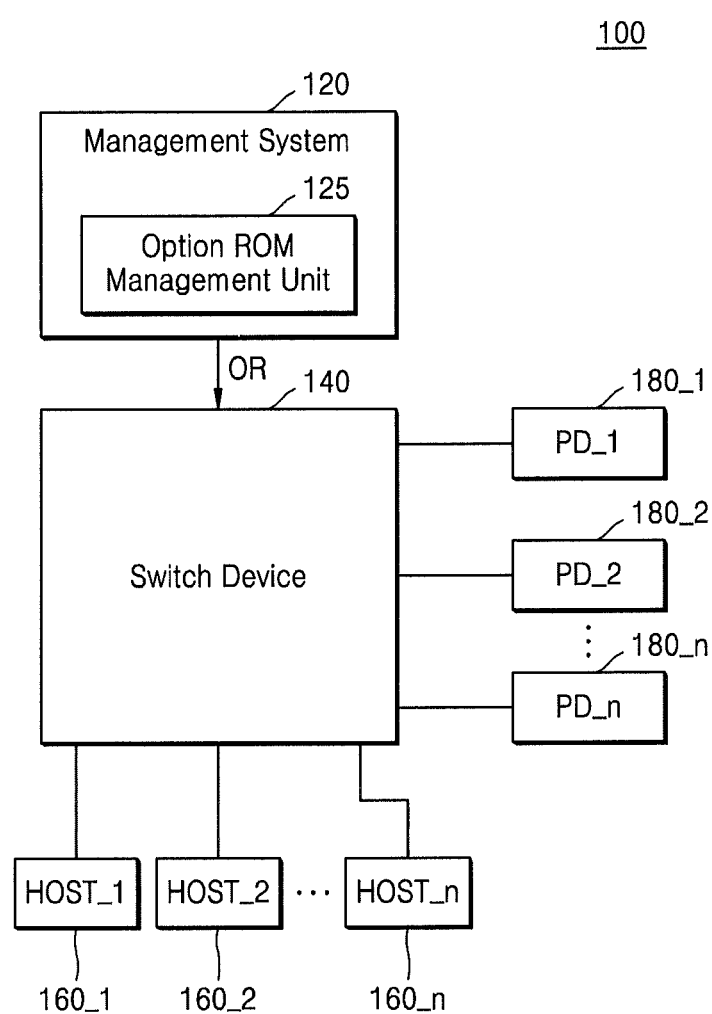
FIG. 1 is a block diagram of a server system according to an exemplary embodiment.

As used herein, the term "and/or" includes any and all combinations of one or more of the associated listed items. Expressions such as "at least one of" when preceding a list of elements, modify the entire list of elements and do not modify the individual elements of the list.

Hereinafter, example embodiments of the inventive concepts will be described in detail with reference to the accompanying drawings. Embodiments of the inventive concept are provided so that this disclosure will be thorough and complete, and will fully convey the concept of the inventive concept to one of ordinary skill in the art. The inventive concepts may, however, be embodied in many different forms and should not be construed as being limited to the embodiments set forth herein. However, this does not limit the inventive concepts within specific embodiments and it should be understood that the inventive concept covers all the modifications, equivalents, and replacements within the idea and technical scope of the inventive concept. Like reference numerals refer to like elements throughout. Dimensions of structures illustrated in the accompanying drawings and an interval between the members may be exaggerated for clarity of the specification.

In the following description, the technical terms are used only for explain a specific exemplary embodiment while not limiting the inventive concepts. The terms of a singular form may include plural forms unless referred to the contrary. The meaning of 'comprise', 'include', or 'have' specifies a property, a region, a fixed number, a step, a process, an element and/or a component but does not exclude other properties, regions, fixed numbers, steps, processes, elements and/or components.

It will be understood that although the terms including an ordinary number such as first or second are used herein to describe various elements, these elements should not be limited by these terms. These terms are only used to distinguish one element from another element. For example, a first element may be referred to as a second element without departing from the spirit and scope of the inventive concept, and similarly, the second element may also be referred to as the first element.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not, be interpreted in an idealized or overly formal sense unless expressly so defined herein.

FIG. 1 is a block diagram of a server system 100 according to an exemplary embodiment.

Referring to FIG. 1, the server system 100 according to an exemplary embodiment may include a management system 120, a switch device 140, a plurality of hosts (HOST_1 to HOST_n) 160_1 to 160_n, and a plurality of physical devices (PD_1 to PD_n) 180_1 to 180_n. In another exemplary embodiment, the switch device 140 may correspond to a peripheral component interconnect express (PCIe) switch device. In addition, the switch device 140 may include a different kind of switch device.

The management system 120, the plurality of hosts 160_1 to 160_n, and the plurality of physical devices 180_1 to 180_n may be connected to each other through the switch device 140. Here, "being connected" denotes that a signal transmission path for routing a signal such as a packet or the like is formed, and the packet may denote a basic unit for transferring a signal. The management system 120 may establish a signal transmission path when a signal is exchanged between the plurality of hosts 160_1 to 160_n and the plurality of physical devices 180_1 to 180_n. In an exemplary embodiment, the management system 120 may generate a plurality of virtual devices in the switch device 140 and may manage the virtual devices to form the signal transmission path. For example, when a first virtual device, which corresponds to a first host 160_1 in one-to-one correspondence, receives a signal such as packet or the like transmitted from the first host 160_1, the management system 120 may control the switch device 140 to transmit the signal of the first host 160_1 to a first physical device 180_1. In this way, the management system 120 may control the switch device 140 to manage signal exchange between the plurality of hosts 160_1 to 160_n and the plurality of physical devices 180_1 to 180_n. The virtual devices may be implemented in the switch device 140, and may not be actual devices but may denote virtual devices which are implemented by software.

Moreover, as an example where the plurality of hosts 160_1 to 160_n perform a hardware function, the management system 120 may manage an operation of transmitting option ROM data OR, corresponding to each of the plurality of physical devices 180_1 to 180_n, to the plurality of hosts 160_1 to 160_n so as to use the plurality of physical devices 180_1 to 180_n. A plurality of drivers, which enable the plurality of physical devices 180_1 to 180_n to be used, may be generated by decoding the option ROM data OR with a bios input/output system (BIOS) of each of the plurality of hosts 160_1 to 160_n. The plurality of hosts 160_1 to 160_n may use the plurality of physical devices 180_1 to 180_n by using the drivers. In another exemplary embodiment, in order to use a plurality of physical devices (not shown) directly connected to the respective hosts 160_1 to 160_n, the management system 120 may manage an operation of transmitting option ROM data OR, corresponding to each of the plurality of physical devices 180_1 to 180_n, to the plurality of hosts 160_1 to 160_n.

The management system 120 may further include an option ROM manager 125. The option ROM manager 125 may transmit option ROM data OR, which is necessary to use each of the plurality of physical devices 180_1 to 180_n, to the plurality of hosts 160_1 to 160_n. For example, the option ROM manager 125 may generate option ROM data OR necessary to use the first physical device 180_1 and may set the option ROM data OR in the option ROM manager 125 before the server system 100 operates. A physical device to be used by the plurality of hosts 160_1 to 160_n may be referred to as a target physical device. Also, the option ROM manager 125 may generate at least one virtual device for transmitting the option ROM data OR to at least one of the plurality of hosts 160_1 to 160_n.

The virtual device may be implemented in the switch device 140, and may not be an actual device but may denote a virtual device which is implemented by software. According to an exemplary embodiment, the option ROM manager 125 may allocate at least one virtual device through the switch device 140 to correspond to the plurality of hosts 160_1 to 160_n, and the relationship may be one-to-one correspondence. For example, when the option ROM manager 125 generates first to nth virtual devices, the option ROM manager 125 may allocate the first virtual device through the switch device 140 to correspond to the first host 160_1, allocate the second virtual device through the switch device 140 to correspond to a second host 160_2, and allocate the nth virtual device through the switch device 140 to correspond to the nth host 160_n in one-to-one correspondence.

The option ROM manager 125 may transmit option ROM data OR, which is necessary for using the plurality of physical devices 180_1 to 180_n, to the plurality of hosts 160_1 to 160_n corresponding to at least one generated virtual device. Also, the option ROM manager 125 may establish an option ROM data transmission path for connecting the plurality of physical devices 180_1 to 180_n to the plurality of hosts 160_1 to 160_n, and the option ROM data transmission path may be a subordinate concept of the above-described signal transmission path. Also, in an exemplary embodiment, the option ROM manager 125 may perform determination based on a connection relationship between the plurality of hosts 160_1 to 160_n and the plurality of physical devices 180_1 to 180_n connected to each other through the switch device 140, for establishing the option ROM data transmission path.

In another exemplary embodiment, the option ROM manager 125 may determine whether to generate at least one virtual device, for transmitting option ROM data OR necessary for using a first physical device 180_1, which is a target physical device to be used by the plurality of hosts 160_1 to 160_n. Whether to generate the at least one virtual device may be determined based on a connection relationship between the first physical device 180_1 (the target physical device) and the plurality of hosts 160_1 to 160_n connected to each other through the switch device 140. This will be described below in detail.

In an exemplary embodiment, the plurality of physical devices 180_1 to 180_n may be connected to the PCIe switch device 140, and option ROM data OR necessary for using the plurality of physical devices 180_1 to 180_n may correspond to PCI option ROM data. Also, the plurality of hosts 160_1 to 160_n may use the plurality of physical devices 180_1 to 180_n by controlling the plurality of physical devices 180_1 to 180_n through the BIOS, which is defined through a unified extensible firmware interface (UEFI).

Moreover, the present embodiment is not limited thereto, and the option ROM data OR may be option ROM data OR necessary for using a software function of each of the plurality of hosts 160_1 to 160_n. For example, the option ROM data OR necessary for using the software function of each of the plurality of hosts 160_1 to 160_n may be option ROM data OR necessary for performing a transfer control protocol/Internet protocol (TCP/IP) function, a dynamic host configuration protocol (DHCP) function, a second extended (EXT2) file system function, and/or the like.

Figure 2:
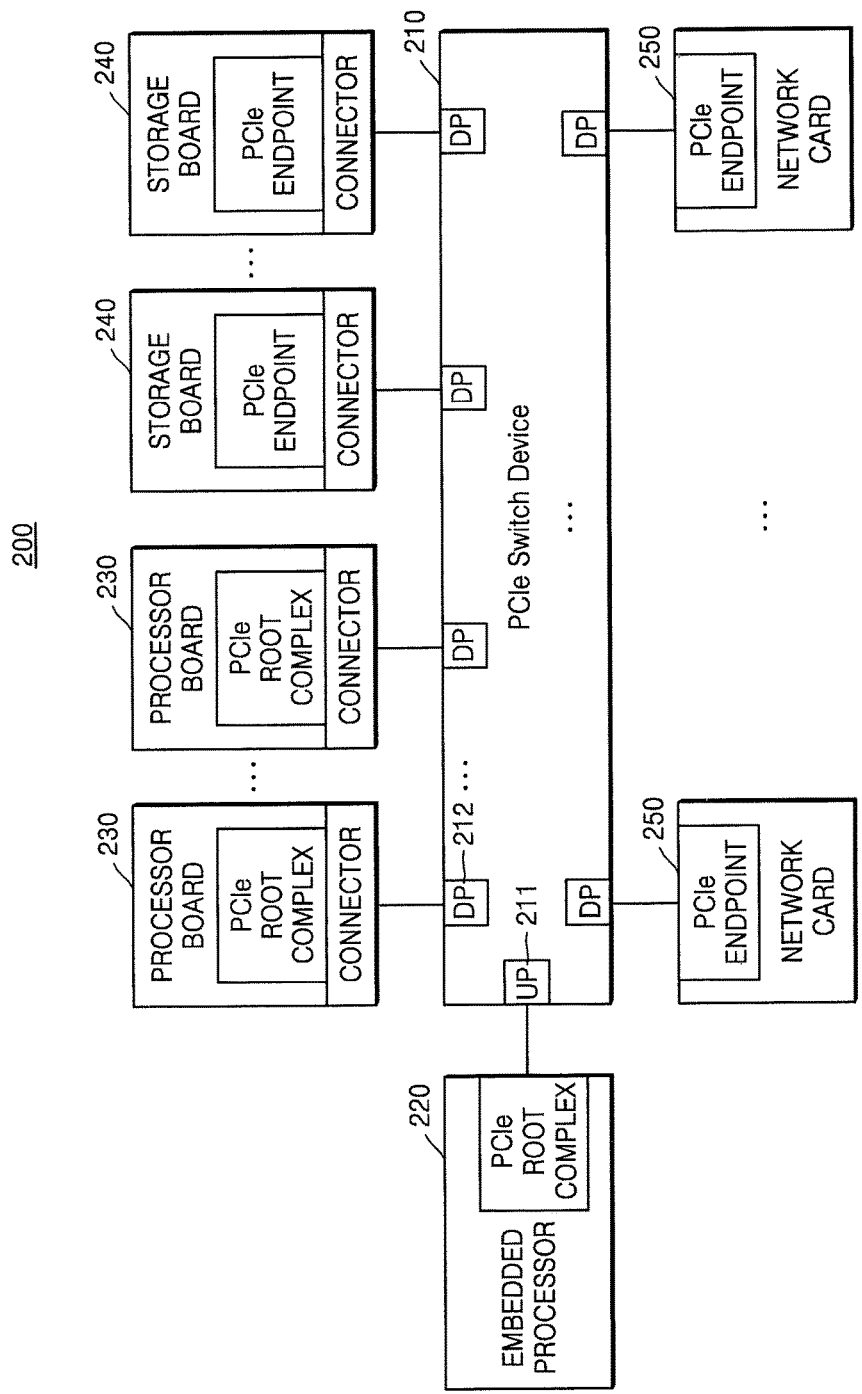
FIG. 2 is a block diagram illustrating a detailed configuration of a server system according to another exemplary embodiment.

FIG. 2 is a block diagram illustrating a detailed configuration of a server system 200 according to another exemplary embodiment.

Referring to FIG. 2, the server system 200 according to another exemplary embodiment may include a PCIe switch device 210, an embedded processor 220, a plurality of processor boards 230, a plurality of storage boards 240, and a plurality of network cards 250. In FIG. 2, the embedded processor 220 may correspond to the management system 120 of FIG. 1, the plurality of processor boards 230 may correspond to the plurality of hosts 160_1 to 160_n of FIG. 1, and the plurality of storage boards 240 and the plurality of network cards 250 may correspond to the plurality of physical devices 180_1 to 180_n of FIG. 1. Also, each of the plurality of storage boards 240 and the plurality of network cards 250 may be a device connected to the PCIe switch device 210 and may be referred to as a PCIe device.

The PCIe switch device 210 may include a plurality of ports 211 and 212. The plurality of ports 211 and 212 may include one upstream port (UP) 211 and a plurality of downstream ports (DP) 212. The PCIe switch device 210 may route a packet from one port to the other port of the plurality of ports 211 and 212.

The PCIe switch device 210 may be mounted on a system board (or a mother board, main board, or the like). Here, the system board may denote a main printed circuit board (PCB) of the server system 200. The system board may include a main component of the server system 200.

The PCIe switch device 210 may include a PCIe interface. A basic link of the PCIe interface may include one lane, and the one lane may include different signal pairs. For example, the one lane may include a signal pair for data transmission and a signal pair for data reception. According to other exemplary embodiments, a PCIe interface of each of x1, x2, x4, x8, and x16 links (where an xN link may include N number of lanes) may be used, but the present embodiment is not limited thereto.

The embedded processor 220 may be configured to process data. The embedded processor 220 may denote a processor that is mounted on the system board and embedded in the system board. The embedded processor 220 may be programmed to control the PCIe switch device 210. As described above, the embedded processor 220 may function as the management system 120 of FIG. 1 that controls the PCIe switch device 210.

The plurality of processor boards 230 may be configured to process data. The plurality of processor boards 230 may be a sub-system of the server system 200 and may be configured as a board which is separate from the system board. The embedded processor 220 and the plurality of processor boards 230 may drive independent operating systems (OSs). According to an exemplary embodiment, the plurality of processor boards 230 and the embedded processor 220 may drive the same OS or different OSs. The embedded processor 220 and the plurality of processor boards 230 may separately operate, or otherwise operate independently.

The plurality of storage boards 240 may be configured to store data. The plurality of storage boards 240 may be a sub-system of the server system 200 and may be configured as a board which is separate from the system board.

For example, the storage board 240 may include a solid state drive (SSD), but is not limited thereto. The SSD may include a semiconductor memory and may store data. For example, the SSD may include a non-volatile memory such as flash memory and/or the like. The SSD may support a non-volatile memory express (NVMe) interface to perform high-speed communication.

The plurality of storage boards 240 and the plurality of network cards 250 may provide single root IO virtualization (SR-IOV). The SR-IOV may denote that a plurality of virtualization machines use one device at a virtual environment.

Figure 3:
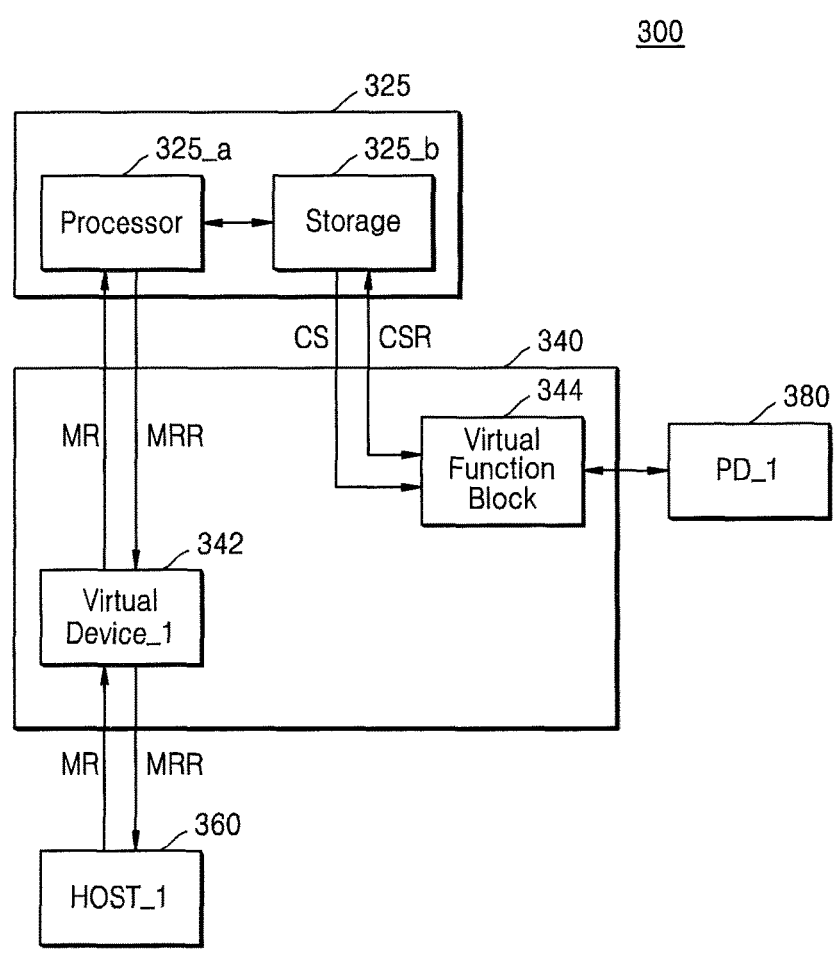
FIG. 3 is a block diagram for describing a management method of a server system according to an exemplary embodiment.

FIG. 3 is a block diagram for describing a management method of a server system 300 according to an exemplary embodiment.

Referring to FIG. 3, the server system 300 may include an option ROM manager 325, a PCIe switch device 340, a first host 360, and a first physical device 380. The option ROM manager 325 may include a processor 325_a and a storage device 325_b. The processor 325_a may generate option ROM data which is necessary for the first host 360 to use the first physical device 380. Also, the generated option ROM data may be stored in the storage device 325_b. In another exemplary embodiment, option ROM data necessary for using the first physical device 380 may be previously set and stored in the storage device 325_b.

The option ROM manager 325 may determine whether to generate option ROM data or whether to generate at least one virtual device for transmitting the option ROM data, based on a connection relationship between the first host 360 and the first physical device 380 connected to each other through the PCIe switch device 340. Furthermore, the option ROM manager 325 may establish an option ROM data transmission path for transmitting option ROM data.

The option ROM manager 325 may check the connection relationship between the first host 360 and the first physical device 380 connected to each other through the PCIe switch device 340. In this case, the option ROM manager 325 may transmit a check signal CS to the first physical device 380. A virtual function block 344 is illustrated as receiving the check signal CS, but is not limited thereto. In other exemplary embodiments, the virtual function block 344 may be provided in the first physical device 380, and thus, the first physical device 380 may receive the check signal CS. The option ROM manager 325 may receive a check response signal CSR which represents the connection relationship between the first host 360 and the first physical device 380. The first physical device 380 may provide SR-IOV to be used by a plurality of hosts in addition to the first host 360. When the first physical device 380 provides the SR-IOV, a meaning of "the first host 360 uses the first physical device 380" may include a meaning of "the first host 360 uses a virtual function block corresponding to the first physical device 380".

Therefore, the option ROM manager 325 may generate at least one virtual function block 344, and the first host 360 may correspond to the virtual function block 344 in one-to-one correspondence. Thus, the first host 360 may be connected to the virtual function block 344, which is virtually generated, and the connection may denote that a signal transmission path for data and/or the like is established. The first host 360 may transmit a signal to the virtual function block 344 by controlling the established signal transmission path through the PCIe switch device 340. For convenience of description, the virtual function block 344 is described as being implemented in the PCIe switch device 340, but is not limited thereto. In other exemplary embodiments, the virtual function block 344 may be implemented outside the PCIe switch device 340.

The virtual function block 344 may not include option ROM data necessary for using the virtual function block 344 or the first physical device 380. Therefore, when the virtual function block 344 is connected to the first host 360 through the PCIe switch device 340, the option ROM manager 325 may generate a first virtual device 342 for transmitting the option ROM data, which is necessary for using the virtual function block 344 or the first physical device 380, to the first host 360. Also, the option ROM manager 325 may generate the option ROM data necessary for using the virtual function block 344 or the first physical device 380.

The option ROM manager 325 may allocate a virtual device through the PCIe switch device 340 to correspond to the first virtual device 342 and the first host 360 and may transmit a memory read request signal MR, which requests option ROM data necessary for the first host 360 to use the first physical device 380, to the first virtual device 342. The option ROM manager 325 may control the PCIe switch device 340 to perform a redirection operation that connects the option ROM manager 325 to the first host 360 in order for the option ROM manager 325 to receive the memory read request signal MR received by the first virtual device 342. When the option ROM manager 325 receives the memory read request signal MR from the first host 360, the option ROM manager 325 may supply a memory read response signal MRR, which includes option ROM data necessary for using the first physical device 380, to the first host 360. In an exemplary embodiment, the option ROM manager 325 may directly transmit the option ROM data to the first host 340 through the PCIe switch device 340, or may transmit the option ROM data through the first virtual device 342.

The option ROM manager 325 may establish a transmission path for transmitting the option ROM data necessary for using the first physical device 380. A scheme where the option ROM manager 325 transmits the option ROM data to the first host 360 may correspond to a first path, and a scheme where the first physical device 380 transmits the option ROM data to the first host 360 may correspond to a second path. This will be described below in detail.

The first host 360 may decode the option ROM data by using a BIOS of the first host 360 to generate a driver corresponding to the first physical device 380, based on the received option ROM data. The first host 360 may use the first physical device 380, based on the generated driver. In another exemplary embodiment, the first host 360 may decode the option ROM data by using the BIOS of the first host 360 to generate a driver for using the virtual function block 344 corresponding to the first physical device 380. The first host 360 may use the first physical device 380 by using the virtual function block 344, based on the generated driver. In an exemplary embodiment, the first physical device 380 may be a network card that provides R-IOV, but is not limited thereto. In other exemplary embodiments, the first physical device 380 may correspond to various devices.

Figure 4:
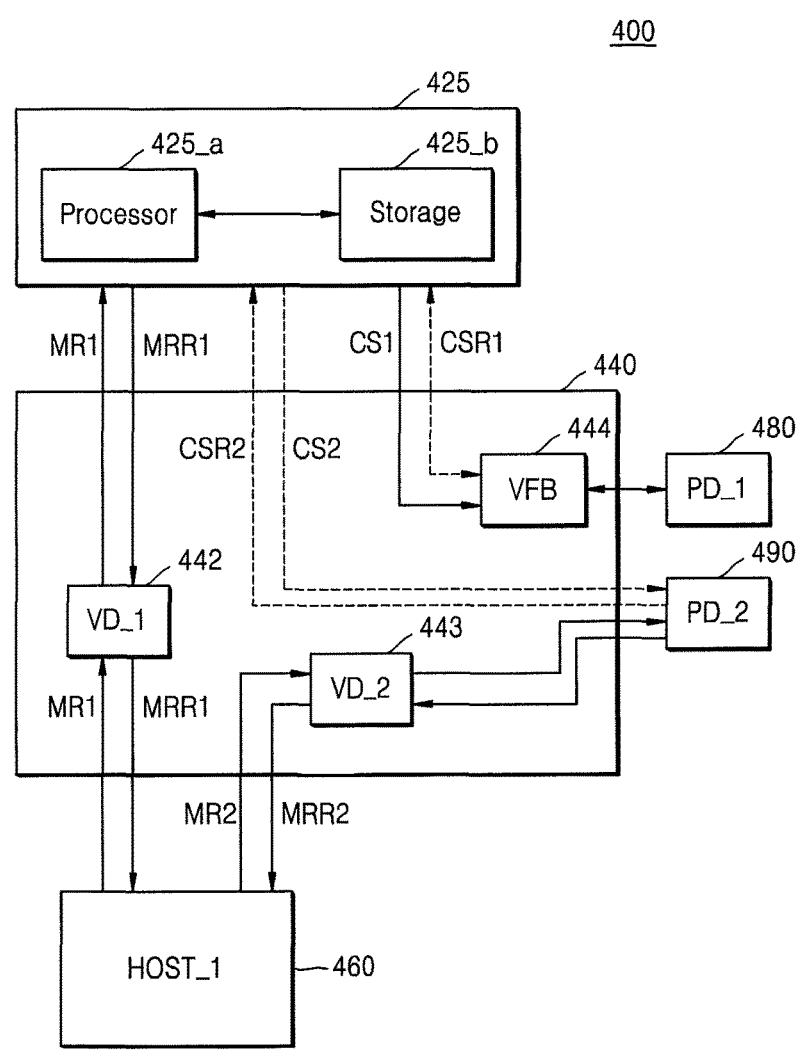
FIG. 4 is a block diagram for describing a management method of a server system according to another exemplary embodiment.

FIG. 4 is a block diagram for describing a management method of a server system 400 according to another exemplary embodiment.

Referring to FIG. 4, the server system 400 may include an option ROM manager 425, a PCIe switch device 440, a first host 460, a first physical device 480, and a second physical device 490. For convenience of description, only the first host 460 is disclosed in the server system 400, but as in FIG. 1, the server system 400 may include a plurality of hosts. At least one virtual function block 444 corresponding to the first physical device 480 may be generated in order for the first host 460 and the plurality of hosts to use the first physical device 480. The second physical device 490 may not generate a virtual function block for the plurality of hosts, unlike the first physical device 480.

The option ROM manager 425 may transmit a first check signal CS1 to the first physical device 480, for checking a connection relationship between the first host 460 and the first physical device 480. The first host 460 may be connected to the virtual function block 444 of the first physical device 480 through the PCIe switch device 440. The virtual function block 444 may not include first option ROM data necessary for using the first physical device 480. The option ROM manager 425 may receive a first check response signal CSR1, including at least one of connection relationship information of the first host 460 and the first physical device 480 and information about where the virtual function block 444 does not include the first option ROM data, from the first physical device 480.

Moreover, the option ROM manager 425 may transmit a second check signal CS2 to the second physical device 490, for checking a connection relationship between the first host 460 and the second physical device 490. The first host 460 may be connected to the second physical device 490 through the PCIe switch device 440. The second physical device 490 may include second option ROM data necessary for using the second physical device 490. The option ROM manager 425 may receive a second check response signal CSR2, including at least one of connection relationship information of the first host 460 and the second physical device 490 and information where the second physical device 490 includes the second option ROM data, from the second physical device 490.

The option ROM manager 425 may include a processor 425_a, which performs operations such as an operation of generating option ROM data, an operation of establishing an option ROM data transmission path, and/or the like, and a storage device 425_b that stores data, including the option ROM data, which is generated or previously set. The option ROM manager 425 may establish an option ROM data transmission path for providing option ROM data necessary for using the first physical device 480 and the second physical device 490, based on the first and second check response signals CSR1 and CSR2 received by the option ROM manager 425.

The option ROM manager 425 may establish, as a first path, an option ROM data transmission path for transmitting the first option ROM data to the first host 460. The first path may be referred to as a transmission path through which the option ROM manager 425 transmits the first option ROM data to the first host 460. The first host 460 may be connected to, through the PCIe switch device 440, the virtual function block 444 which does not include the first option ROM data necessary for using the first physical device 480, and thus, the option ROM manager 425 may generate a first virtual device (VD1) 442, for transmitting the first option ROM data to the first host 460. The option ROM manager 425 may allocate the generated first virtual device 442 to the first host 460 through the PCIe switch device 440 in order for the first virtual device 442 to correspond to the first host 460. The first host 460 may transmit a first memory read request signal MR1 to the first virtual device 442, and when the first memory read request signal MR1 is transmitted to the first virtual device 442, the option ROM manager 425 may perform a redirection operation of connecting the option ROM manager 425 to the first host 460, for directly receiving the first memory read request signal MR1. Also, the option ROM manager 425 may transmit a first memory read response signal MRR1, including the first option ROM data which is stored or set in the storage device 425_b, to the first host 460.

The option ROM manager 425 may establish, as a second path, an option ROM data transmission path for transmitting the second option ROM data to the first host 460. The second path may be referred to as a transmission path through which the second physical device 490 transmits the second option ROM data to the first host 460. The first host 460 may be connected to, through the PCIe switch device 440, the second physical device 490 which includes the second option ROM data necessary for using the second physical device 490, and thus, the option ROM manager 425 may generate a second virtual device (VD2) 443, for transmitting the second option ROM data to the first host 460. The option ROM manager 425 may allocate the generated second virtual device 443 to the first host 460 through the PCIe switch device 440 in order for the second virtual device 443 to correspond to the first host 460. The first host 460 may transmit a second memory read request signal MR2 to the second physical device 490 through the second virtual device 443. The second physical device 490 may transmit a second memory read response signal MRR2, including the second option ROM data stored in a non-volatile memory or the like included in the second physical device 490, to the first host 460.

Figure 5A:
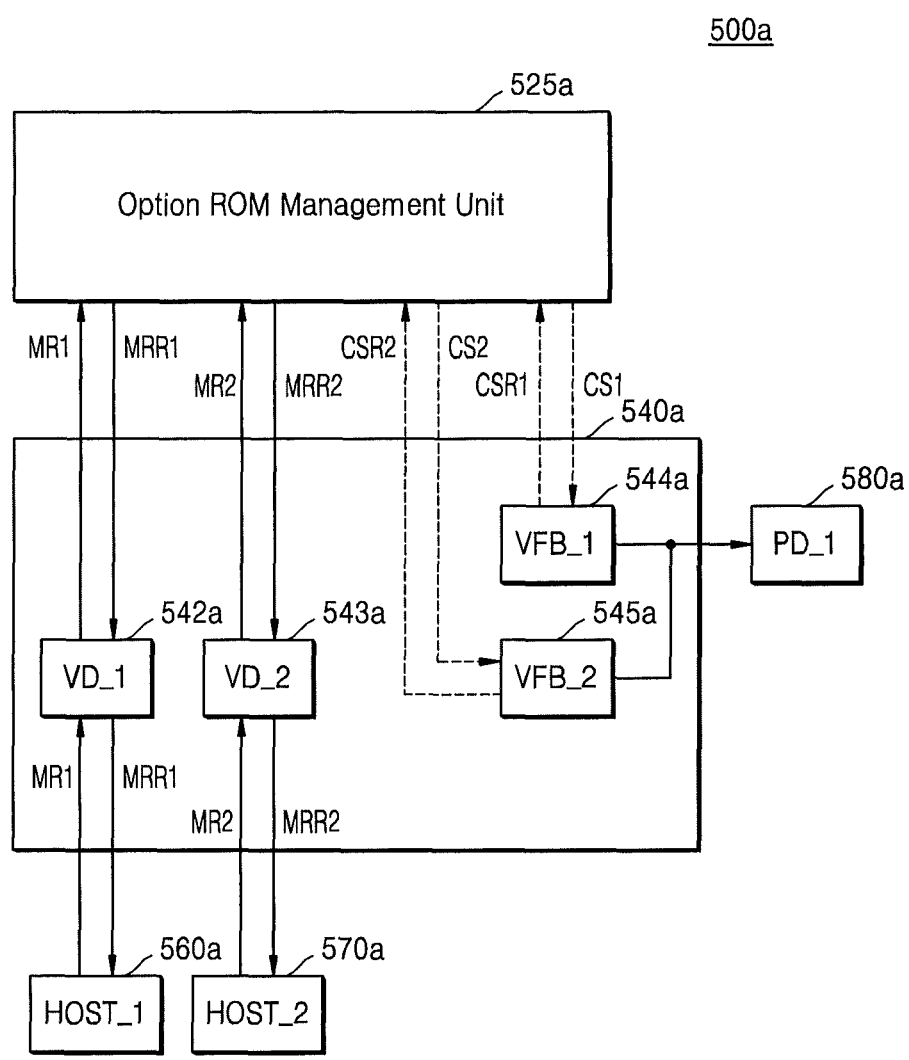
FIGS. 5A and 5B are block diagrams for describing a management method of a server system according to another exemplary embodiment.
Figure 5B:
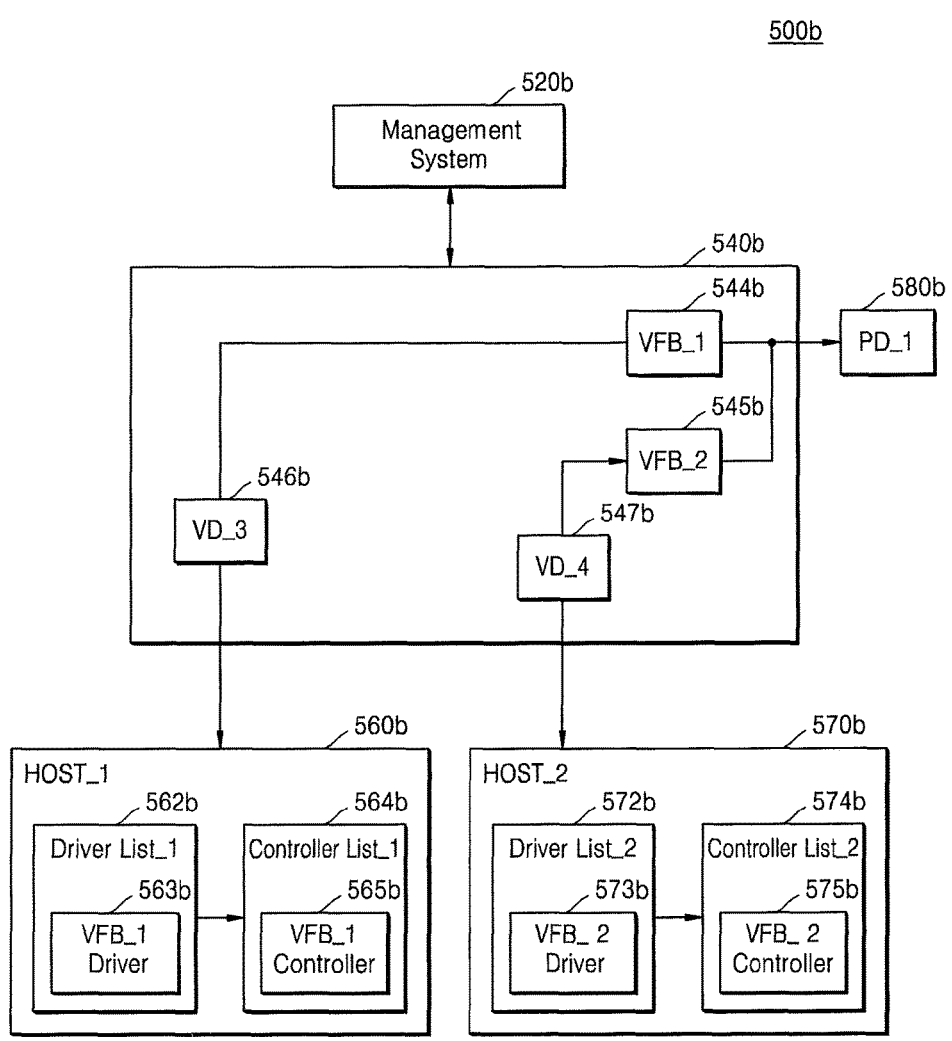

FIG. 5A is a block diagram for describing a management method of a server system 500a according to another exemplary embodiment. FIG. 5B is a block diagram for describing a management method of a server system 500b according to another exemplary embodiment.

Referring to FIG. 5A, the server system 500a may include an option ROM manager 525a, a PCIe switch device 540a, a first host 560a, a second host 570a, and a first physical device 580a. The option ROM manager 525a may generate a first virtual function block 544a and a second virtual function block 545a corresponding to the first physical device 580a in order for the first and second hosts 560a and 570a to use the first physical device 580a.

The option ROM manager 525a may transmit a first check signal CS1 and a second check signal CS2 to the first physical device 580a, for checking a connection relationship between the first and second hosts 560a and 570a and the first physical device 580a. The first host 560a may be connected to the first virtual function block 544a of the first physical device 580a through the PCIe switch device 540a. The second host 570a may be connected to the second virtual function block 545a of the first physical device 580a through the PCIe switch device 540a. The first and second virtual function blocks 544a and 545a may not include first option ROM data necessary for using the first and second virtual function blocks 544a and 545a or the first physical device 580a. The option ROM manager 525a may receive a first check response signal CSR1, including at least one of connection relationship information of the first host 560a and the first physical device 580a and information where the first virtual function block 544a does not include the first option ROM data, from the first physical device 580a. Also, the option ROM manager 525a may receive a second check response signal CSR2, including at least one of connection relationship information of the second host 570a and the first physical device 580a and information where the second virtual function block 545a does not include the first option ROM data, from the first physical device 580a.

The option ROM manager 525a may perform operations such as an operation of generating option ROM data, an operation of establishing an option ROM data transmission path, and/or the like, and may store data including the option ROM data which is generated or previously set. The option ROM manager 525a may establish an option ROM data transmission path for providing the first option ROM data necessary for using the first and second virtual function blocks 544a and 545a or the first physical device 580a, based on the first and second check response signals CSR1 and CSR2 received by the option ROM manager 525a.

The option ROM manager 525a may establish, as a first path, an option ROM data transmission path for transmitting the first option ROM data to the first host 560a. The first path may be referred to as a transmission path through which the option ROM manager 525a transmits the first option ROM data to each of the first and second hosts 560a and 570a. The first host 560a may be connected to, through the PCIe switch device 540a, the first virtual function block 544a which does not include the first option ROM data necessary for using the first virtual function block 544a or the first physical device 580a, and thus, the option ROM manager 525a may generate a first virtual device (VD_1) 542a, for transmitting the first option ROM data to the first host 560a. The option ROM manager 525a may allocate the generated first virtual device 542a to the first host 560a through the PCIe switch device 540a in order for the first virtual device 542a to correspond to the first host 560a. The first host 560a may transmit a first memory read request signal MR1 to the first virtual device 542a, and when the first memory read request signal MR1 is transmitted to the first virtual device 542a, the option ROM manager 525a may perform a redirection operation of connecting the option ROM manager 525a to the first host 560a, for directly receiving the first memory read request signal MR1. Also, the option ROM manager 525a may transmit a first memory read response signal MRR1, including the first option ROM data which is stored or set, to the first host 560a.

The option ROM manager 525a may establish, as a first path, an option ROM data transmission path for transmitting the first option ROM data to the second host 570a. The first path may be referred to as a transmission path through which the option ROM manager 525a transmits the first option ROM data to each of the first and second hosts 560a and 570a. The second host 570a may be connected to, through the PCIe switch device 540a, the second virtual function block 545a which does not include the first option ROM data necessary for using the second virtual function block 545a or the first physical device 580a, and thus, the option ROM manager 525a may generate a second virtual device (VD_2) 543a, for transmitting the first option ROM data to the second host 570a. The option ROM manager 525a may allocate the generated second virtual device 543a to the second host 570a through the PCIe switch device 540a in order for the second virtual device 543a to correspond to the second host 570a. The second host 570a may transmit a second memory read request signal MR2 to the second virtual device 543a, and when the second memory read request signal MR2 is transmitted to the second virtual device 543a, the option ROM manager 525a may perform a redirection operation of connecting the option ROM manager 525a to the second host 570a, for directly receiving the second memory read request signal MR2. Also, the option ROM manager 525a may transmit a second memory read response signal MRR2, including the first option ROM data which is stored or set, to the second host 570a.

As described above, the option ROM manager 525a quickly and accurately transmits the first option ROM data, which is necessary for using the first physical device 580a, to the plurality of hosts, namely, the first and second hosts 560a and 570a.

Referring to FIG. 5B, the server system 500b may include a management system 520b, a PCIe switch device 540b, a first host 560b, a second host 570b, and a first physical device 580b. As described above with reference to FIG. 5A, the first host 560b and the second host 570b may receive first option ROM data, which is necessary for using the first physical device 580b, from the option ROM manager 525a of FIG. 5A.

The first host 560b may include a first driver list 562b and a first controller list 564b. The first host 560b may decode the first option ROM data by using a BIOS of the first host 560b to generate a driver for using the first physical device 580b. In an exemplary embodiment, the first physical device 580b may be a device that provides SR-IOV, and may use the first physical device 580b through a plurality of virtual function blocks, namely, first and second virtual function blocks 544b and 545b, at a virtual environment. Therefore, the first host 560b may use the first physical device 580b through the first virtual function block 544b, and to this end, a first virtual function block driver 563b may be generated in the first driver list 562b. Also, a first virtual function block controller 565b and a first virtual function block driver 563b, which are included in the first controller list 564b, may be mapped to each other for controlling the first virtual function block 544b, but the present embodiment is not limited thereto. In other exemplary embodiments, a first physical device driver may be generated in the first driver list 562b and may be mapped to the first virtual function block controller 565b included in the first controller list 564b.

The second host 570b may include a second driver list 572b and a second controller list 574b. The second host 570b may decode the first option ROM data by using a BIOS of the second host 570b to generate a driver for using the first physical device 580b. The second host 570b may use the first physical device 580b through the second virtual function block 545b, and to this end, a second virtual function block driver 573b may be generated in the second driver list 572b. Also, a second virtual function block controller 575b and the second virtual function block driver 573b, which are included in the second controller list 574b, may be mapped to each other for controlling the second virtual function block 545b, but the present embodiment is not limited thereto. In other exemplary embodiments, a second physical device driver may be generated in the second driver list 572b and may be mapped to a second physical device controller included in the second controller list 574b.

The management system 520b may control the PCIe switch device 540b to establish a signal transmission path between the first host 560b and the first virtual function block 544b and a signal transmission path between the second host 570b and the second virtual function block 545b. For example, the management system 520b may generate a third virtual device 546b and a fourth virtual device 547b. The third virtual device 546b may be allocated to the first host 560b, and the fourth virtual device 547b may be allocated to the second host 570b through the PCIe switch device 540b. When the first host 560b transmits a signal to the third virtual device 546b, the management system 520b may control the PCIe switch device 540b to transmit the signal, received by the third virtual device 546b, to the first virtual function block 544b. In this way, the first host 560b may use the first physical device 580b by using the first virtual function block 544b.

Moreover, when the second host 570b transmits a signal to the fourth virtual device 547b, the management system 520b may control the PCIe switch device 540b to transmit the signal, received by the fourth virtual device 547b, to the second virtual function block 545b. In this way, the second host 570b may use the first physical device 580b by using the second virtual function block 545b.

In an exemplary embodiment, the third virtual device 546b may correspond to the first virtual device 542a of FIG. 5A, and the fourth virtual device 547b may correspond to the second virtual device 543a of FIG. 5A. Therefore, the first host 560b may transmit a signal to the third virtual device 546b through the generated first virtual device 542a of FIG. 5A, and the second host 570b may transmit a signal to the fourth virtual device 547b through the generated second virtual device 543a of FIG. 5A.

Figure 6:
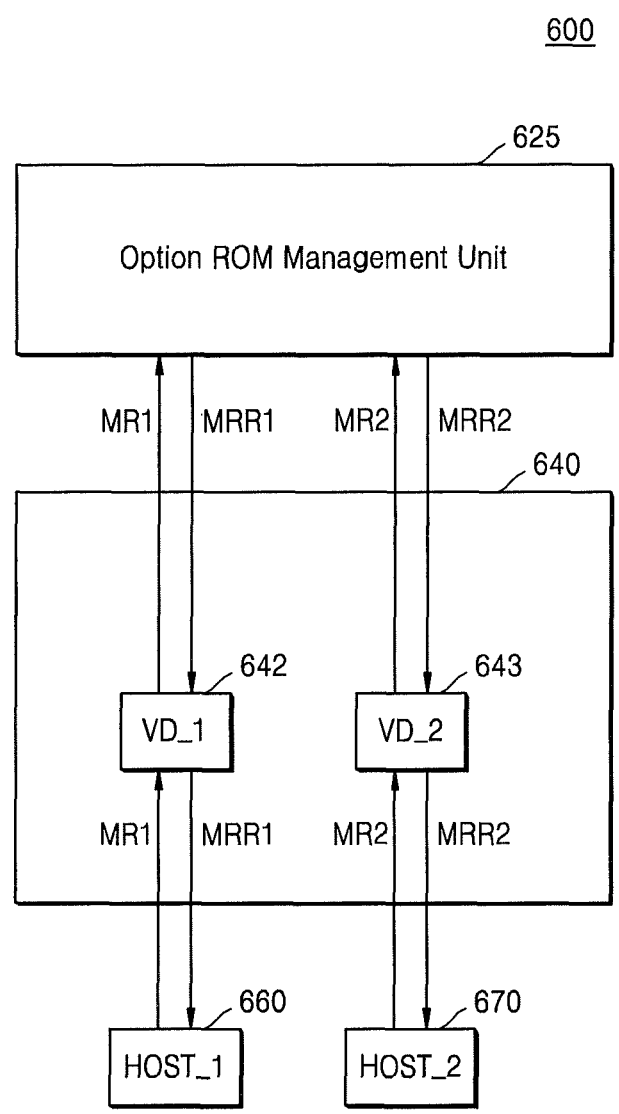
FIG. 6 is a diagram for describing a management method of a server system according to another exemplary embodiment.

FIG. 6 is a diagram for describing a management method of a server system 600 according to another exemplary embodiment.

Referring to FIG. 6, the server system 600 may include an option ROM manager 625, a PCIe switch device 640, a first host 660, and a second host 670. The first host 660 and the second host 670 may perform a software function. For example, each of the first and second hosts 660 and 670 may perform, as the software function, a transfer control protocol/Internet protocol (TCP/IP) function, a dynamic host configuration protocol (DHCP) function, a second extended (EXT2) file system function, and/or the like.

Each of the first and second hosts 660 and 670 may use option ROM data suitable for various software functions, for performing the various software functions. Therefore, the option ROM manager 625 may generate at least one piece of option ROM data necessary for performing various software functions and may store the generated option ROM data, or option ROM data may be previously stored in the option ROM manager 625 by a user. Also, the option ROM manager 625 may directly supply the stored option ROM data to the first host 660 and the second host 670.

The option ROM manager 625 may establish an option ROM data transmission path for transmitting option ROM data to the first host 660 and the second host 670. When establishing an option ROM data transmission path for transmitting necessary option ROM data in performing a software function of each of the first and second hosts 660 and 670, the option ROM manager 625 may establish the option ROM data transmission path, based on whether the option ROM data is necessary for each of the first and second hosts 660 and 670.

In an exemplary embodiment, when option ROM data is necessary for the first host 660 to perform a software function, the option ROM manager 625 may perform an operation that establishes an option ROM data transmission path and includes an operation of generating a first virtual device (VD_1) 642. The option ROM manager 625 may allocate the generated first virtual device 642 to the first host 660 through the PCIe switch device 640 in order for the first virtual device 642 to correspond to the first host 660. The first host 660 may transmit a first memory read request signal MR1 to the first virtual device 642, and when the first memory read request signal MR1 is transmitted to the first virtual device 642, the option ROM manager 625 may perform a redirection operation of connecting the option ROM manager 625 to the first host 660, for directly receiving the first memory read request signal MR1. Also, the option ROM manager 625 may transmit a first memory read response signal MRR1, including option ROM data which is stored or set, to the first host 660. In another exemplary embodiment, the first host 660 may previously store option ROM data necessary for performing a software function, and thus, when it is not required for the first host 660 to receive the option ROM data from the option ROM manager 625, the option ROM manager 625 may not generate the first virtual device 642.

When option ROM data is necessary for the second host 670 to perform a software function, the option ROM manager 625 may perform an operation that establishes an option ROM data transmission path and includes an operation of generating a second virtual device (VD_2) 643. The option ROM manager 625 may allocate the generated second virtual device 643 to the second host 670 through the PCIe switch device 640 in order for the second virtual device 643 to correspond to the second host 670. The second host 670 may transmit a second memory read request signal MR2 to the second virtual device 643, and when the second memory read request signal MR2 is transmitted to the second virtual device 643, the option ROM manager 625 may perform a redirection operation of connecting the option ROM manager 625 to the second host 670, for directly receiving the second memory read request signal MR2. Also, the option ROM manager 625 may transmit a second memory read response signal MRR2, including option ROM data which is stored or set, to the second host 670. In another exemplary embodiment, the second host 670 may previously store option ROM data necessary for performing a software function, and thus, when it is not required for the second host 670 to receive the option ROM data from the option ROM manager 625, the option ROM manager 625 may not generate the second virtual device 643.

Such a configuration may be an exemplary configuration, and the technical spirit of the above-described present embodiment may be applied to the server system 600 including two or more hosts.

Figure 7:
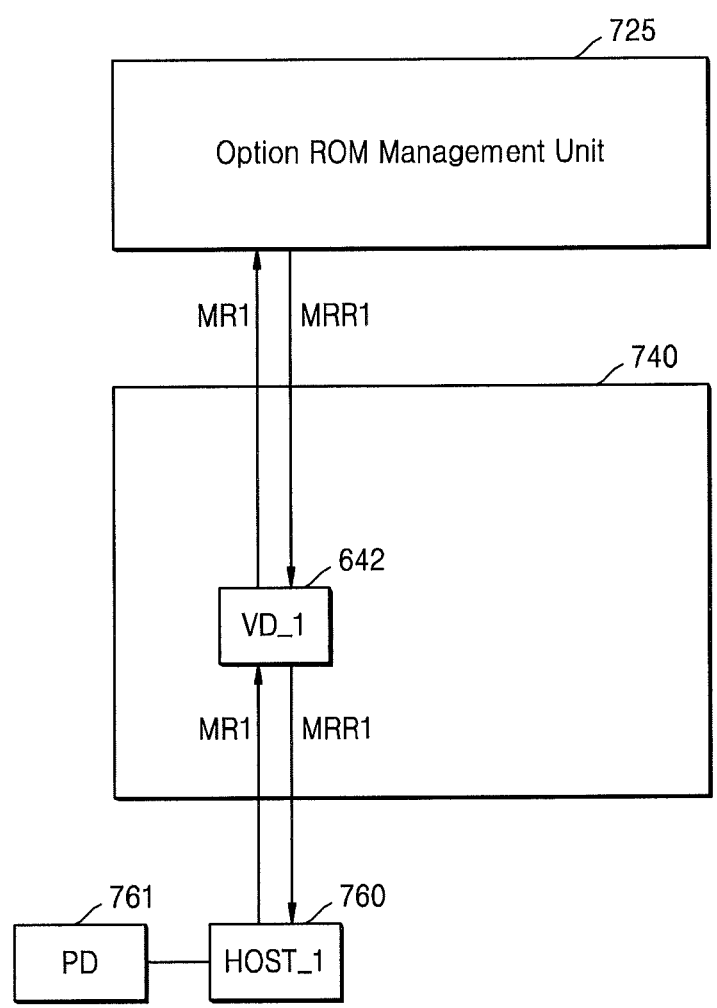
FIG. 7 is a diagram for describing a management method of a server system according to another exemplary embodiment.

FIG. 7 is a diagram for describing a management method of a server system 700 according to another exemplary embodiment.

Referring to FIG. 7, the server system 700 may include an option ROM manager 725, a PCIe switch device 740, a first host 760, and a physical device 761 directly connected to the first host 760. The first host 760 may perform a hardware function by using the physical device 761.

The first host 760 may use option ROM data necessary for using the physical device 761. Therefore, the option ROM manager 725 may generate the option ROM data necessary for using the physical device 761 and may store the generated option ROM data, or option ROM data may be previously stored in the option ROM manager 725 by a user. Also, the option ROM manager 725 may directly supply the stored option ROM data to the first host 760.

The option ROM manager 725 may establish an option ROM data transmission path for transmitting option ROM data to the first host 760. In establishing the option ROM data transmission path, the option ROM manager 725 may establish the option ROM data transmission path, based on whether the option ROM data is necessary for the first host 760. This has been described above in detail with reference to FIG. 6 and thus is not described. Also, a configuration disclosed in FIG. 7 may be an exemplary configuration, and the technical spirit of the above-described present embodiment may be applied in order for the server system 700, including a plurality of hosts directly connected to a plurality of physical devices, to receive option ROM data necessary for using the plurality of physical devices connected to the plurality of hosts.

Figure 8:
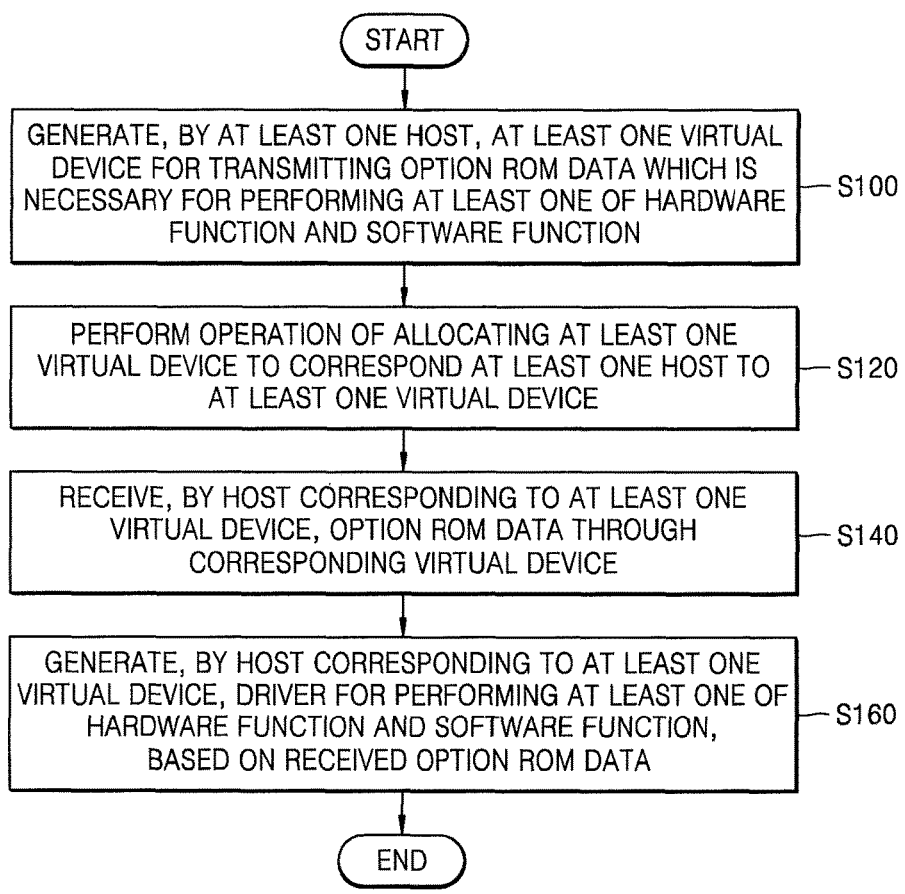
FIG. 8 is a flowchart illustrating a management method of a server system according to an exemplary embodiment.

FIG. 8 is a flowchart illustrating a management method of a server system according to an exemplary embodiment.

Referring to FIG. 8, in operation S100, at least one host may generate at least one virtual device for transmitting option ROM data which is necessary for performing at least one of a hardware function and a software function. In operation S120, an operation of allocating the generated at least one virtual device to correspond the at least one host to the generated at least one virtual device may be performed. In operation S140, the option ROM data may be transmitted to at least one target host which is a host corresponding to the at least one virtual device. In operation S160, the host corresponding to the at least one virtual device may generate a driver for performing at least one of the hardware function and the software function, based on the option ROM data received by the host.

Figure 9:
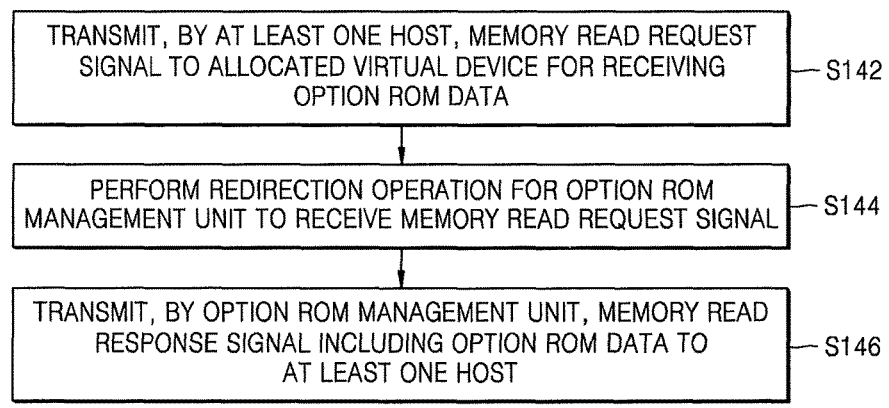
FIG. 9 is a flowchart illustrating a method of receiving option ROM data.

FIG. 9 is a flowchart illustrating a method of receiving option ROM data.

Referring to FIGS. 1 and 9, in operation S142, the first host 180_1 corresponding to at least one host may transmit a memory read request signal to a virtual device which is generated by the option ROM manager 125 and is allocated to the first host 180_1 to correspond to the first host 180_1, for receiving option ROM data. Subsequently, in operation S144, the option ROM manager 125 may control the PCIe switch device 140 to perform a redirection operation, for receiving the memory read request signal. In operation S146, the option ROM manager 125 may transmit a memory read response signal, including the option ROM data, to the first host 180_1.

Figure 10:
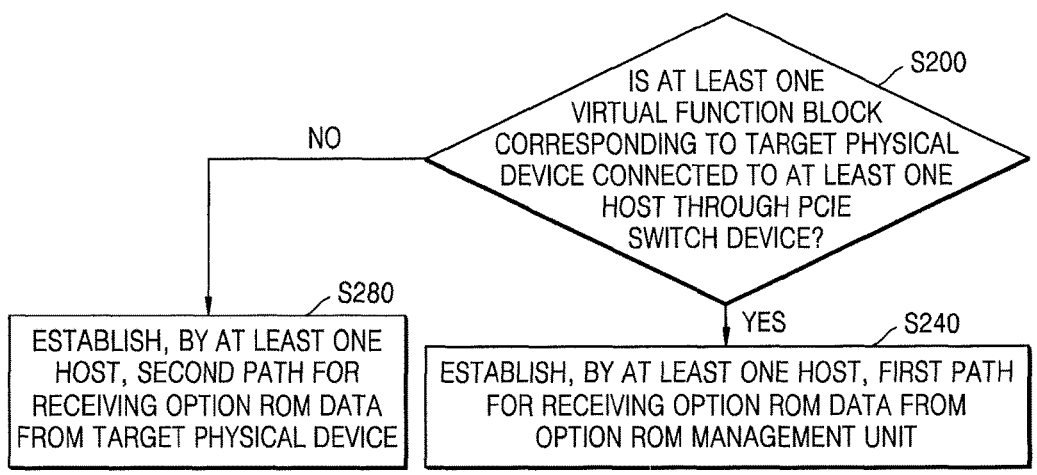
FIG. 10 is a flowchart illustrating a management method of an option ROM manager included in a management system according to another exemplary embodiment.

FIG. 10 is a flowchart illustrating a management method of an option ROM manager included in a management system according to another exemplary embodiment.

Referring to FIGS. 1 and 10, in an exemplary embodiment, when the first host 160_1 desires to perform a hardware function by using a target physical device, the option ROM manager 125 may determine whether a virtual function block corresponding to the first physical device 180_1, which is a target physical device, is connected to the first host 160_1 corresponding to at least one host through a PCIe switch device in operation S200. As described above, "being connected" may denote "a path for exchanging a signal being generated". Also, in another exemplary embodiment, the option ROM manager 125 may determine whether the first physical device 180_1 which is the target physical device generates a virtual function block, and may establish a below-described path. Also, the first physical device 180_1 which is the target physical device may provide SR-IOV, but is not limited thereto. In other exemplary embodiments, the first physical device 180_1 may provide various programs.

Since the first physical device 180_1 provides the SR-IOV, the first physical device 180_1 may be used through the virtual function block. In this case, when the first host 160_1 is connected to the virtual function block, in order for the first host 160_1 corresponding to the at least one host to receive option ROM data from the option ROM manager 125, the option ROM manager 125 may control the PCIe switch device to establish an option ROM data transmission path as a first path in operation S240. The first path through which the first host 160_1 receives the option ROM data from the option ROM manager 125 has been described above in detail with reference to FIG. 9, and thus, its detailed description is not repeated.

When the first physical device 180_1 does not generate the virtual function block and thus the virtual function block is not connected to the first host 160_1, the option ROM manager 125 may establish a second path in order for the first host 160_1 to receive the option ROM data from the first physical device 180_1 which is the target physical device in operation S280.

Figure 11:
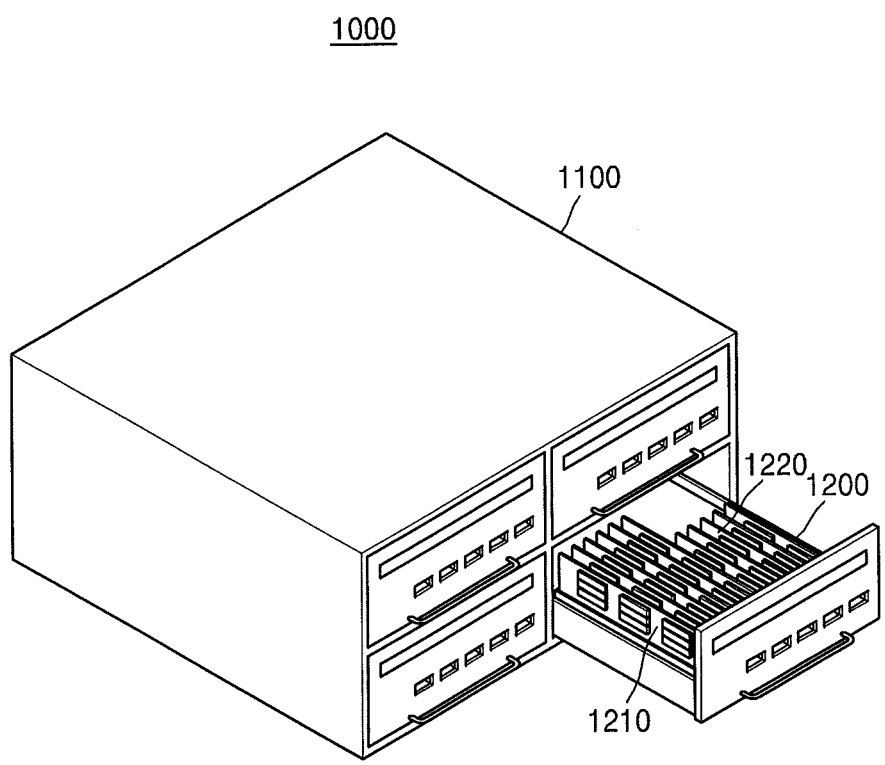
FIG. 11 is a diagram illustrating a sled type server chassis including a server system according to an exemplary embodiment.

FIG. 11 is a diagram illustrating a sled type server chassis 1000 including a server system according to an exemplary embodiment.

Referring to FIG. 11, the sled type server chassis 1000 may include a body 1100 and a plurality of sled servers 1200 which are installed in the body 1100.

The body 1100 may include resources such as a power device, an input/output (I/O) device, a peripheral device, etc. The plurality of sled servers 1200 may receive various resources from the body 1100 to function as a server. Each of the sled servers 1200 may include the sever system 100 (200, 300, 400, 500a, and 500b) described above with reference to FIG. 1 and the like. Therefore, a management system included in the sever system 100 (200, 300, 400, 500a, and 500b) may simultaneously transmit option ROM data, which is necessary for a plurality of hosts to use a physical device, to the plurality of hosts. A system board may include an embedded processor or not. The system board may include an embedded storage device or not.

In each of the sled servers 1200, the number of processor boards 1210 and the number of storage boards 1220 may be flexibly changed depending on a workload. A user may equip a relatively more number of the processor boards 1210 than the number of the storage boards 1220 in each of the sled servers 1200 to implement a web server system.

Alternatively, the user may equip a relatively more number of the storage boards 1220 than the number of the processor boards 1210 in each of the sled servers 1200 to implement a storage server system.

Figure 12:
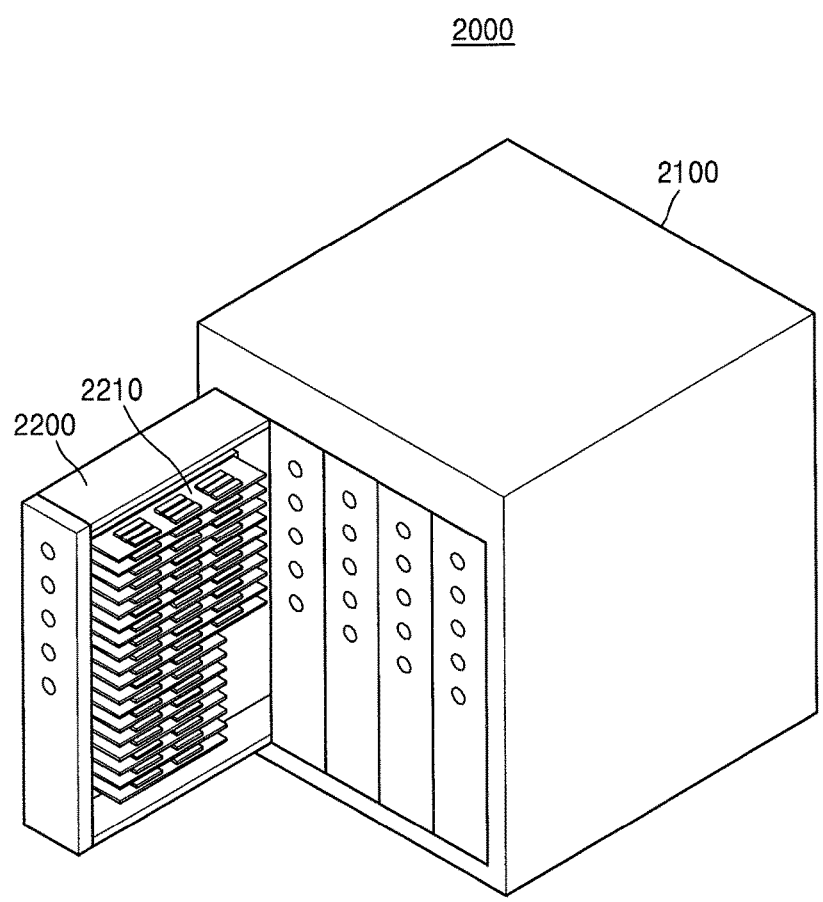
FIG. 12 is a diagram illustrating a blade type server chassis including a server system according to an exemplary embodiment.

FIG. 12 is a diagram illustrating a blade type server chassis 2000 including a server system according to an exemplary embodiment.

Referring to FIG. 12, the blade type server chassis 2000 may include a body 2100 and a plurality of blade servers 2200 which are installed in the body 2100.

The body 2100 may include resources such as a power device, an input/output (I/O) device, a peripheral device, etc.

The plurality of blade servers 2200 may receive various resources from the body 2100 to function as a server. Each of the blade servers 2200 may include the sever system 100 (200, 300, 400, 500a, and 500b) described above with reference to FIG. 1 and the like. Therefore, a management system included in the sever system 100 (200, 300, 400, 500a, and 500b) may simultaneously transmit option ROM data, which is necessary for a plurality of hosts to use a physical device, to the plurality of hosts. A system board may include an embedded processor or not. The system board may include an embedded storage device or not.

In each of the blade servers 2200, the number of processor boards 2210 and the number of storage boards 2220 may be flexibly changed depending on a workload.

A user may equip a relatively more number of the processor boards 2210 than the number of the storage boards 2220 in each of the blade servers 2200 to implement a web server system. Alternatively, the user may equip a relatively more number of the storage boards 2220 than the number of the processor boards 2210 in each of the blade servers 2200 to implement a storage server system.

The operations of the above-described method or algorithm according to the exemplary embodiments may be directly implemented by a hardware module, a software module, or a combination thereof executed by a processor. The software module may be equipped in a random access memory (RAM), flash memory, a ROM, an erasable programmable read-only memory (EPROM), an electrically erasable and programmable read only memory (EEPROM), a register, a hard disk, a removable disk, CD-ROM, or a non-transitory computer-readable recording medium well known to one of ordinary skill in the art. An exemplary recording medium may be connected to a processor, and the processor may read information from the recording medium and may write information in the recording medium. In another exemplary embodiment, the recoding medium may be implemented as one body with the processor. The processor and the recording medium may be equipped in an application-specific integrated circuit (ASIC). The ASIC may be equipped in a user terminal. In another exemplary embodiment, the processor and the recording medium may be equipped as separate elements in the user terminal.

While the inventive concepts have been particularly shown and described with reference to exemplary embodiments thereof, it will be understood that various changes in form and details may be made therein without departing from the spirit and scope of the following claims.

What is claimed is:

1. A management method of a server system including at least one host, a management system, and a switch device connecting the at least one host to the management system, the management method comprising:
generating at least one virtual device for transmitting option read-only memory (ROM) data that is necessary for the at least one host to perform at least one of a hardware function and a software function;
allocating the at least one virtual device to the at least one host to correspond to the at least one host; and
transmitting the option ROM data to at least one target host corresponding to the at least one virtual device, wherein:
the server system comprises at least one physical device connected to the switch device,
the option ROM data is necessary for the at least one host to use a target physical device of the at least one physical device, and
the management method further comprises determining whether to generate the at least one virtual device for transmitting option ROM data, which is necessary for using the target physical device, to the at least one host, based on a connection relationship between the at least one host and the target physical device connected to each other through switch device.

2. The management method of claim 1, wherein
the management system comprises an option ROM manager, and
the option ROM manager comprises a processor, which generates the option ROM data, and a storage that stores the option ROM data.

3. The management method of claim 1, wherein the switch device is a peripheral component interconnect express (PCIe) switch device.

4. The management method of claim 1, wherein the allocating of the at least one virtual device comprises connecting the at least one virtual device to the at least one host through the switch device in one-to-one correspondence.

5. The management method of claim 1, wherein
the server system comprises at least one physical device connected to the at least one host, and
the at least one host connect the at least one physical device based on the option ROM data.

6. The management method of claim 1, further comprising:
receiving the option ROM data, by the at least one target host,
transmitting a memory read request signal, which requests the option ROM data, to a virtual device corresponding to the at least one target host; and
performing a redirection operation for the management system to receive the memory read request signal.

7. The management method of claim 6, further comprising, when the management system receives the memory read request signal, by the management system, transmitting a memory read response signal including the option ROM data to the at least one target host in response to the memory read request signal.

8. The management method of claim 1, further comprising generating, by the at least one target host, a driver for performing at least one of the hardware function and the software function, based on the transmitted option ROM data.

9. The management method of claim 1, wherein
the server system comprises at least one virtual function block corresponding to the target physical device for the at least one host to use the target physical device, and
when the at least one host is connected to the at least one virtual function block through the switch device, the server system generates the at least one virtual device for transmitting the option ROM data, which is necessary for using the target physical device, to the at least one host.

10. A management method of a management system, which controls a peripheral component interconnect express (PCIe) switch device connected to a plurality of hosts and the management system, the management method comprising:
establishing, by the management system, a path through which the plurality of hosts receive option read-only memory (ROM) data that is necessary for the plurality of hosts to perform at least one of a hardware function and a software function; and
controlling, by the management system, the PCIe switch device for the plurality of hosts to receive the option ROM data, based on a result of the path establishment, wherein:
the PCIe switch device is connected to at least one physical device,
the plurality of hosts use a target physical device of the at least one physical device for performing the hardware function, and
the establishing of the path comprises differently establishing, by the plurality of hosts, the path according to whether the plurality of hosts are connected to a plurality of virtual function blocks corresponding to the target physical device through the PCIe switch device, in order for the plurality of hosts to use the target physical device.

11. The management method of claim 10, further comprising:
generating, by the management system, a plurality of virtual devices for transmitting the option ROM data; and
allocating each of the plurality of virtual devices to each of the plurality of hosts, respectively.

12. The management method of claim 11, wherein the controlling of the PCIe switch device comprises:
transmitting, by the plurality of hosts, a memory read request signal to the plurality of virtual devices for receiving the option ROM data;
performing a redirection operation for the management system to receive the memory read request signal; and
transmitting, by the management system, a memory read response signal including the option ROM data to the plurality of hosts.

13. The management method of claim 11, further comprising:
determining, by the management system, whether to generate a plurality of virtual devices for transmitting the option ROM data, based on whether the option ROM data is necessary for each of the plurality of hosts.

14. The management method of claim 10, wherein the establishing of the path for receiving the option ROM data comprises, when the plurality of hosts are connected to the plurality of virtual function blocks, by the management system, establishing a first path through which the plurality of hosts receive the option ROM data from the management system.

15. The management method of claim 10, wherein the establishing of the path for receiving the option ROM data comprises, when the plurality of hosts are directly connected to the target physical device without being connected to the plurality of virtual function blocks, by the management system, establishing a second path through which the plurality of hosts receive the option ROM data from the target physical device.

16. The management method of claim 15, wherein the controlling of the PCIe switch device comprises:
   transmitting, by the plurality of hosts, a memory read request signal to the target physical device for receiving the option ROM data; and
   transmitting, by the target physical device, a memory read response signal including the option ROM data to the plurality of hosts.

17. A server system comprising:
   an embedded processor;
   at least one processor board that functions as a host;
   at least one peripheral component interconnect express (PCIe) device; and
   a PCIe switch device that includes a plurality of ports connected to the embedded processor, the at least one processor board, and the at least one PCIe device,
   wherein the embedded processor generates option read-only memory (ROM) data which is necessary for the at least one processor board to use the at least one PCIe device, and controls the at least one PCIe switch device to transmit the generated option ROM data to the at least one processor board,
   wherein:
      the option ROM data is necessary for the at least one processor board to use a target PCIe device of the at least one PCIe device, and the embedded processor determines whether to generate at least one virtual device transmitting option ROM data, which is necessary for using the target PCIe device, to the at least one processor board, based on a connection relationship between the at least one processor board and the target PCIe device connected to each other through the PCIe switch device.

18. The server system of claim 17, wherein the at least one PCIe device comprises at least one of a network card and a storage board.

* * * * *